United States Patent
Bäumer et al.

(10) Patent No.: US 8,047,109 B2
(45) Date of Patent: Nov. 1, 2011

(54) DEVICE FOR TRANSVERSALLY CUTTING A ROLLED STRIP

(75) Inventors: Klaus Bäumer, Kreuztal (DE); Jürgen Merz, Llsenburg (DE)

(73) Assignee: SMS Siemag Aktiengesellschaft, Dusseldorf (DE)

(*) Notice: Subject to any disclaimer, the term of this patent is extended or adjusted under 35 U.S.C. 154(b) by 0 days.

(21) Appl. No.: 10/560,330

(22) PCT Filed: May 25, 2004

(86) PCT No.: PCT/EP2004/005582
§ 371 (c)(1),
(2), (4) Date: Dec. 10, 2005

(87) PCT Pub. No.: WO2004/110688
PCT Pub. Date: Dec. 23, 2004

(65) Prior Publication Data
US 2006/0272465 A1    Dec. 7, 2006

(30) Foreign Application Priority Data
Jun. 12, 2003 (DE) .................... 103 26 383

(51) Int. Cl.
*B23D 25/02* (2006.01)
(52) U.S. Cl. ................. 83/310; 83/109; 83/156; 83/308
(58) Field of Classification Search ............... 83/37, 84, 83/155–157, 303, 310, 694, 933, 934, 32, 83/78, 109, 111–113, 284, 308, 436.3, 436.4, 83/469, 495, 343
See application file for complete search history.

(56) References Cited

U.S. PATENT DOCUMENTS

| | | | | |
|---|---|---|---|---|
| 2,076,969 A | * | 4/1937 | Sieger | 83/20 |
| 2,120,313 A | * | 6/1938 | Smitmans | 83/80 |
| 2,141,104 A | * | 12/1938 | Buccicone | 226/93 |
| 2,238,542 A | * | 4/1941 | Talbot | 83/324 |
| 4,189,965 A | * | 2/1980 | Kollann | 83/155 |
| 4,399,727 A | * | 8/1983 | Omori et al. | 83/345 |
| 5,191,818 A | | 3/1993 | Mantovan et al. | |
| 5,363,728 A | * | 11/1994 | Elsner et al. | 83/23 |

FOREIGN PATENT DOCUMENTS

| | | |
|---|---|---|
| DE | 1 270 368 | 5/1962 |
| GB | 477 076 | 12/1937 |
| GB | 1 221 599 | 2/1971 |
| JP | 2001276910 | 10/2001 |

* cited by examiner

*Primary Examiner* — Phong Nguyen
(74) *Attorney, Agent, or Firm* — Lucas & Mercanti, LLP; Klaus P. Stoffel

(57) ABSTRACT

The invention relates to a device for transversally cutting a rolled strip using shears, especially drum shears. According to the invention, a gap between the end of the roller table upstream of the shears and the beginning of the roller table downstream of the shears, where there is no support for the rolled strip, is reduced by a pivotable roller table part supporting the rolled strip as it passes through, and a mobile guiding table is arranged between said pivotable roller table part and the beginning of the rear roller table.

5 Claims, 1 Drawing Sheet

DEVICE FOR TRANSVERSALLY CUTTING A ROLLED STRIP

BACKGROUND OF THE INVENTION

The invention concerns a device for cutting rolled strip to length with a shear, especially a rotary shear, in which a gap between the end of the roller table upstream of the shear and the beginning of the roller table downstream of the shear, where the rolled strip is unsupported, is reduced by a swiveling roller table part that supports the rolled strip as it passes through.

Shears for cutting rolled strip to length in a hot rolling wide strip mill, in a cold-rolling tandem mill, and in hot rolling and cold rolling mills are well known. The use of crank shears and rotary shears is preferred for this purpose. Designs of rotary shears are described, for example, in DE 199 53 906 A1 and in DE 100 01 928 A1.

DE 12 70 368 describes a crank shear for rolled steel in which a conveying roller table has a gap in the area of the cutter circle. A rotating conveying segment that has approximately the width of the cutter and is provided with an approximately semicircularly curved outer surface closes the gap in the conveying roller table when the segment is in its upper position.

A disadvantage of the known designs of a device of this type for cutting rolled strip to length is that, although the distance of the support points/support lines of the rolled strip upstream and downstream of the shear is reduced by a conveying segment that can be rotated in, the rolled strip experiences a deviation from the rolling or conveying direction, depending on the thickness, the surface tension, etc. Due to the greater distances between the support points or lines, the strip flow is disturbed in the device for cutting rolled strip to length. The leading end of the strip reacts very sensitively to these greater distances. The rolled strip can become oriented towards the top or the bottom in this area and can become jammed, e.g., between the conveying segment and the roller table. The equipment has to be shut down. The thinner the rolled strip is, the greater the danger that this will occur.

SUMMARY OF THE INVENTION

Therefore, the objective of the invention is to create a device for cutting rolled strip to length which avoids the aforesaid disadvantages.

In accordance with the invention, this objective is achieved by arranging a movable guide table between a swiveling roller table part and the beginning of the downstream roller table. This movable guide table reduces the distance without support points/support lines for the rolled strip in such a way that deviation of the rolled strip is not possible.

It is advantageous if an additional, movable guide table that is interlocked with the swiveling roller table part is arranged between the end of the upstream roller table and the swiveling roller table. The gap in the roller table is then completely closed.

In an advantageous refinement of the invention, the upper drum and the lower drum have flattened surfaces on their outer periphery. This creates a larger opening for the passage of the rolled strip, and during the threading of the rolled strip, the drums, especially the upper drum, do not present obstacles on which the rolled strip is stopped.

It is also advantageous for a movable deflector to be arranged in front of the upper drum. This provides an entry funnel for the rolled strip, thereby preventing upward deviation of the rolled strip.

Additional refinements of the device of the invention are specified in the dependent claims.

A specific embodiment of the invention is described in greater detail below with reference to the highly schematic drawings.

BRIEF DESCRIPTION OF THE DRAWINGS

FIG. 1 shows a device for cutting rolled strip to length in the position in which the beginning of the strip is threaded in.

DETAILED DESCRIPTION OF THE INVENTION

Figure 1:
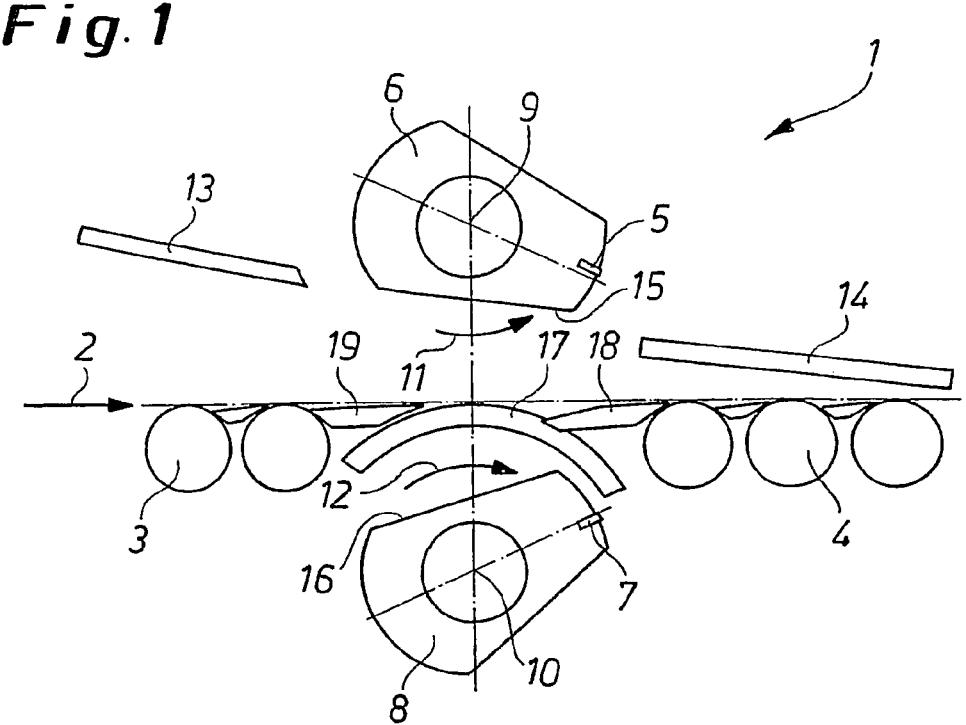

FIG. 1 shows a device 1 for cutting rolled strip 2 to length with a front roller table 3 and a rear roller table 4. The rolled strip 2 is cut by an upper cutter 5, which is mounted on an upper drum 6, and a lower cutter 7, which is mounted on a lower drum 8. The drums 6, 8 rotate in opposite directions about an upper axis of rotation 9 and a lower axis of rotation 10. The direction of rotation is indicated by arrows 11, 12.

A movable deflector 13 is located above the front roller table 3. A stationary or movable deflector 14 is located above the rear roller table 4.

The drums 6, 8 are rotated in such a way during the threading of the strip that the flattened surfaces 15, 15', 16, 16', especially the flattened surface 15 on the upper drum 6, are oriented, together with the movable deflector 13, so as to form an entry funnel.

To ensure that the rolled strip 2, which is supported on the front roller table 3, arrives safely on the rear roller table 4, a swiveling roller table part 17 is rotated into a gap between the roller tables. In this rotation, the swiveling roller table part 17 moves around the lower drum 8. To close the gap completely, movable guide tables 18, 19 are arranged between the swiveling roller table part 17 and the front roller table 3 and between the swiveling roller table part 17 and the rear roller table 4. To close the gap completely, the swiveling roller table part 17 and the movable guide table 18, 19 are imtermeshed.

Figure 2:
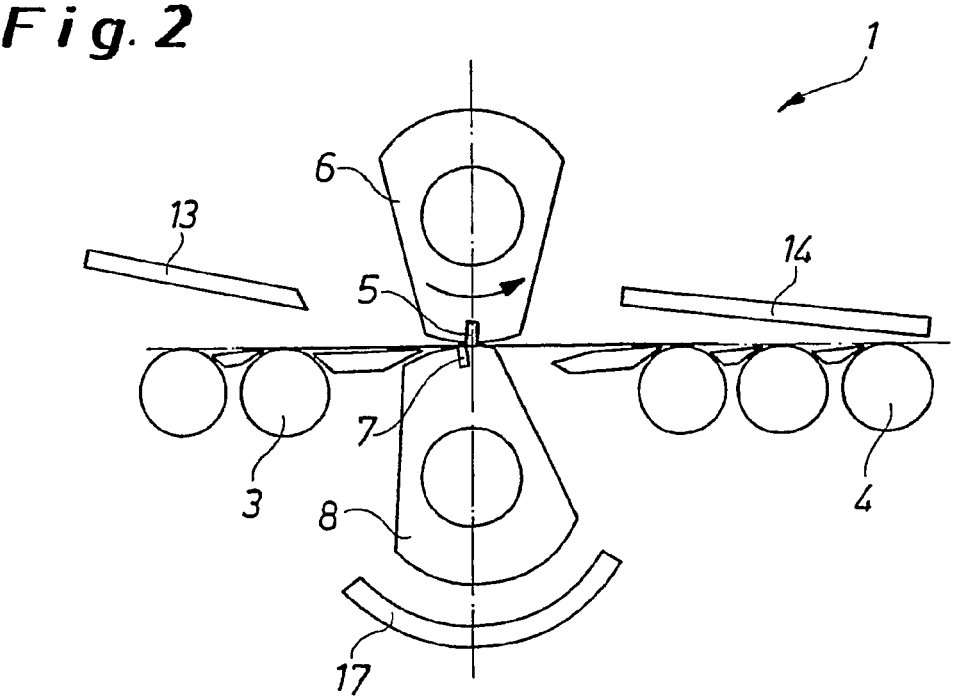
FIG. 2 shows a device according to FIG. 1 in the cutting position.

FIG. 2 shows the rolled strip 2 and the drums 6, 8 with the cutters 5, 7. The cutters 5, 7 are now positioned in a cutting position. To this end, the upper drum 6 with the upper cutter 5 and the lower drum 8 with the lower cutter 7 are rotated in opposite directions about the upper axis of rotation 9 and the lower axis of rotation 10, respectively. To accomplish this, the swiveling roller table part 17 was rotated out of the gap in the roller table.

To prevent damage to the swiveling roller table 17 by, for example, falling residual pieces of the rolled strip 2, the swiveling roller table part 17 is rotated in such a way that it is covered by the lower drum 8.

In addition, the movable guide tables 18, 19 can avoid the circular arc through which the lower cutter 8 moves. This is accomplished, for example, by a linear lateral movement or a rotational movement.

LIST OF REFERENCE NUMBERS 1 cut-to-length device
2 rolled strip
3 front roller table
4 rear roller table
5 upper cutter
6 upper drum
7 lower cutter
8 lower drum 9 upper axis of rotation
10 lower axis of rotation
11 direction of rotation of the upper drum
12 direction of rotation of the lower drum
13 movable deflector
14 stationary deflector
15, 15' flattened surface of the upper drum
16, 16' flattened surface of the lower drum
17 movable roller table part
18 movable guide table
19 movable guide table

The invention claimed is:

1. Device for cutting rolled metal strip to length with a rotary shear, in which a gap between an end of a front roller table upstream of the shear and a beginning of a rear roller table downstream of the shear, where the rolled metal strip is unsupported, is reduced by a swiveling roller table part that supports the rolled metal strip as it passes through during a non-cutting operating phase of the shear, wherein a first movable guide table (18) is arranged between a swiveling roller table part (17) and the beginning of the rear roller table (4), wherein the swiveling roller table part is formed as a circle-segment that is rotatable about an axis so that an outer surface of the swiveling roller table part (17) is intermittently intermeshed with an outer surface of the first movable guide table (18) to intermittently close the gap as the roller table part (17) swivels, wherein the swiveling roller table part (17) is fastened to a rotational axis of a lower drum (8) independently of the lower drum.

2. Device in accordance with claim 1, wherein a second movable guide table (19) is arranged between the end of the front roller table (3) and the swiveling roller table part (17).

3. Device in accordance with claim 1, having an upper drum (6) and the lower drum (8) with flattened surfaces (15, 15', 16, 16') on their outer periphery.

4. Device in accordance with claim 3, wherein a movable deflector (13) is arranged upstream of the upper drum (6).

5. Device in accordance with claim 3, wherein a stationary or movable deflector (14) is arranged downstream of the upper drum (6).

* * * * *